US008985943B2

(12) United States Patent
Groves et al.

(10) Patent No.: US 8,985,943 B2
(45) Date of Patent: Mar. 24, 2015

(54) TURBOCHARGER VARIABLE-NOZZLE ASSEMBLY WITH VANE SEALING ARRANGEMENT

(75) Inventors: Chris Groves, Vosges (FR); Lionel Toussaint, Vosges (FR); Peter Davies, Vosges (FR); Pierre Barthelet, Vosges (FR)

(73) Assignee: Honeywell International Inc., Morristown, NJ (US)

( * ) Notice: Subject to any disclaimer, the term of this patent is extended or adjusted under 35 U.S.C. 154(b) by 686 days.

(21) Appl. No.: 13/250,679

(22) Filed: Sep. 30, 2011

(65) Prior Publication Data
US 2013/0084161 A1  Apr. 4, 2013

(51) Int. Cl.
F04D 29/56 (2006.01)
F01D 17/16 (2006.01)
F01D 11/00 (2006.01)
F02C 6/12 (2006.01)

(52) U.S. Cl.
CPC ............ F01D 17/165 (2013.01); F01D 11/001 (2013.01); F01D 11/003 (2013.01); F02C 6/12 (2013.01)
USPC ........................................................ 415/162

(58) Field of Classification Search
CPC ....... F01D 17/16; F01D 11/00; F01D 17/165; F01D 11/001; F01D 11/003
USPC ................. 415/164, 162, 165, 166, 159, 157
See application file for complete search history.

(56) References Cited

U.S. PATENT DOCUMENTS

| 6,916,153 | B2* | 7/2005 | Boening | 415/163 |
| 7,074,009 | B2* | 7/2006 | Allmang et al. | 415/177 |
| 7,189,058 | B2* | 3/2007 | Metz et al. | 415/165 |
| 7,399,156 | B2* | 7/2008 | Sterner et al. | 415/164 |
| 2008/0031728 | A1* | 2/2008 | Sausse et al. | 415/160 |
| 2009/0060726 | A1* | 3/2009 | Severin et al. | 415/182.1 |
| 2009/0272112 | A1* | 11/2009 | Arnold et al. | 60/602 |
| 2010/0008774 | A1* | 1/2010 | Scholz et al. | 415/209.3 |

FOREIGN PATENT DOCUMENTS

WO  WO 2004/027218 A1  4/2004

* cited by examiner

Primary Examiner — Nathaniel Wiehe
Assistant Examiner — Michael Sehn
(74) Attorney, Agent, or Firm — John C. James

(57) ABSTRACT

A variable-nozzle turbocharger includes a turbine housing and a center housing, and a generally annular nozzle ring and an array of vanes rotatably mounted to the nozzle ring such that the vanes can be pivoted about their axes for regulating exhaust gas flow to the turbine wheel. The vanes extend between the nozzle ring and an opposite wall formed by an insert in the turbine housing. A vane sealing member is supported on the insert, and has a portion disposed between distal ends of the vanes and the insert. This portion of the vane sealing member is configured to be contacted by the distal ends of the vanes when the vanes are in the closed position, while a clearance exists between the portion of the vane sealing member and the distal ends of the vanes when the vanes are in the open position.

9 Claims, 5 Drawing Sheets

TURBOCHARGER VARIABLE-NOZZLE ASSEMBLY WITH VANE SEALING ARRANGEMENT

BACKGROUND OF THE INVENTION

The present invention relates to turbochargers having a variable-nozzle turbine in which an array of movable vanes is disposed in the nozzle of the turbine for regulating exhaust gas flow into the turbine.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing, and the air is compressed by the compressor wheel and is then discharged from the housing to the engine air intake.

One of the challenges in boosting engine performance with a turbocharger is achieving a desired amount of engine power output throughout the entire operating range of the engine. It has been found that this objective is often not readily attainable with a fixed-geometry turbocharger, and hence variable-geometry turbochargers have been developed with the objective of providing a greater degree of control over the amount of boost provided by the turbocharger. One type of variable-geometry turbocharger is the variable-nozzle turbocharger (VNT), which includes an array of variable vanes in the turbine nozzle. The vanes are pivotally mounted in the nozzle and are connected to a mechanism that enables the setting angles of the vanes to be varied. Changing the setting angles of the vanes has the effect of changing the effective flow area in the turbine nozzle, and thus the flow of exhaust gas to the turbine wheel can be regulated by controlling the vane positions. In this manner, the power output of the turbine can be regulated, which allows engine power output to be controlled to a greater extent than is generally possible with a fixed-geometry turbocharger.

One such variable-nozzle assembly comprises a generally annular nozzle ring that supports the array of vanes. The vanes are rotatably mounted to the nozzle ring and connected to a rotatable actuator ring such that rotation of the actuator ring rotates the vanes for regulating exhaust gas flow to the turbine wheel. The assembly can also include an insert having a tubular portion received by and sealed into the bore of the turbine housing and having a nozzle portion extending generally radially out from one end of the tubular portion, the nozzle portion being axially spaced from the nozzle ring such that the vanes extend between the nozzle ring and the nozzle portion. The nozzle portion of the insert and the nozzle ring can be rigidly connected to each other to maintain a fixed axial spacing between the nozzle portion of the insert and the nozzle ring.

The above-described variable-nozzle assembly is effective, but further improvements are sought.

BRIEF SUMMARY OF THE DISCLOSURE

In particular, an area of potential improvement relates to the sealing between the vanes and the walls of the nozzle formed by the nozzle ring and the nozzle portion of the insert. Typical variable-nozzle assemblies are constructed such that there are gaps between the ends of the vanes and the adjacent walls of the nozzle. It is probably not possible to completely eliminate such gaps, inasmuch as the vane must be able to pivot, but reducing the widths of the gaps should result in improved turbine performance because less of the exhaust gas would leak through the gaps. The challenge then becomes how to reduce the sizes of the gaps without impairing the ability of the vanes to pivot.

The present disclosure addresses the above needs and achieves other advantages, by providing a turbocharger having a variable-nozzle assembly, comprising:

a compressor housing and a compressor wheel mounted in the compressor housing and connected to a rotatable shaft, and a turbine housing and a turbine wheel mounted in the turbine housing and connected to the rotatable shaft, the turbine housing defining a chamber surrounding the turbine wheel for receiving exhaust gas from an engine and for supplying the exhaust gas through a nozzle leading from the chamber generally radially inwardly to the turbine wheel, the turbine housing further defining an axial bore;

an insert formed separately from the turbine housing, the insert having a tubular portion received into the axial bore of the turbine housing and an annular nozzle portion joined to one end of the tubular portion and extending radially outward therefrom;

a nozzle ring having opposite first and second faces, the nozzle being defined between the second face and the nozzle portion of the insert, the nozzle ring having a plurality of circumferentially spaced-apart bearing apertures each extending axially from the first face to the second face;

a plurality of vanes disposed in the nozzle and each having a proximal end and a distal end, axles being joined to the proximal ends and being received into the bearing apertures of the nozzle ring and being rotatable in the bearing apertures, the distal ends of the vanes being proximate the nozzle portion of the insert, the vanes being rotatable between a closed position and an open position; and a generally annular vane sealing member formed separately from the insert and supported on the nozzle portion of the insert, the vane sealing member having a portion that is disposed between the distal ends of the vanes and the nozzle portion of the insert;

wherein said portion of the vane sealing member is configured to contact leading and trailing edge portions of the distal ends of the vanes and to exert an axial load on the vanes tending to urge the vanes toward the nozzle ring when the vanes are in the closed position, while a clearance exists between said portion of the vane sealing member and said leading and trailing edge portions of the distal ends of the vanes when the vanes are in the open position.

It has been demonstrated that reducing the vane clearance is particularly important when the vanes are approaching the closed position because the leakage flow becomes a more-significant percentage of the total flow at that operating condition and therefore has a more-pronounced effect on turbine efficiency. The inventive variable-nozzle assembly results in the vane clearance being reduced or eliminated when the vanes are in their closed position, where clearance reduction is most important. At the same time, the vanes can freely pivot when they are open because the vane sealing member does not contact the ends of the vanes in that position.

The nozzle ring and the nozzle portion of the insert in one embodiment are connected to each other by a plurality of spacers, and the vane sealing member includes apertures through which the spacers pass. This provides an anti-rotation feature for the vane sealing member.

In one embodiment, the vane sealing member includes a flange that extends generally axially from a radially outer edge of the vane sealing member, and the flange engages a radially outer surface of the nozzle portion of the insert.

The vane sealing member can include a lip that extends generally axially from a radially inner edge of the vane sealing member, and the insert can include a groove in which the lip is engaged so as to locate the vane sealing member with respect to the insert.

The vane sealing member can be a compliant (i.e., elastically and resiliently deformable) thin sheet metal part that can provide a light spring load on the distal ends of the vanes. Contact between the vanes and the vane sealing member is designed to provide a positive (non-zero) clearance at the vane leading and trailing edges when the vanes are in the open position. This minimizes friction and the risk of vane sticking.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present inventions now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
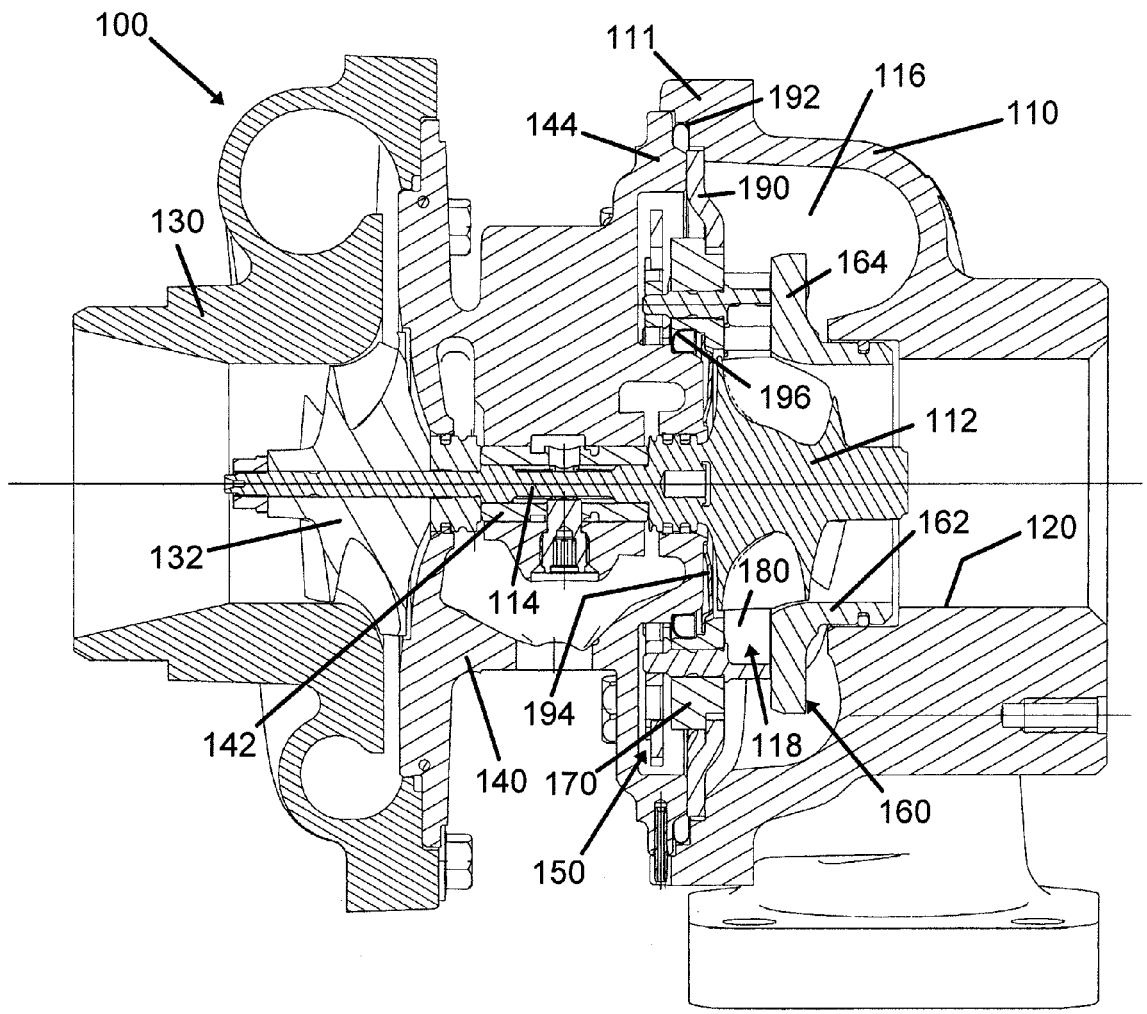
FIG. 1 is a cross-sectional view of a turbocharger having a variable-nozzle assembly in accordance with an embodiment of the invention.

A turbocharger 100 in accordance with one embodiment of the invention is shown in FIG. 1. The turbocharger includes a turbine comprising a turbine housing 110 and a turbine wheel 112 mounted in the turbine housing and connected to a rotatable shaft 114 for rotation therewith. The turbine housing defines a chamber 116 surrounding the turbine wheel for receiving exhaust gas, and there is a nozzle 118 leading from the chamber generally radially inwardly to the turbine wheel. The turbine housing also defines an axially extending bore 120 through which exhaust gas is discharged after passing through the turbine wheel.

The turbocharger further comprises a compressor comprising a compressor housing 130 and a compressor wheel 132 mounted in the compressor housing and connected to the rotatable shaft 114 for rotation therewith. A center housing 140 is connected between the compressor housing 130 and the turbine housing 110. The shaft 114 passes through the center housing, which supports bearings 142 for the shaft.

The turbocharger further comprises a variable-nozzle assembly 150 that includes an insert 160 having a tubular portion 162 received into the bore 120 of the turbine housing and having a generally annular nozzle portion 164 extending generally radially out from one end of the tubular portion. The variable-nozzle assembly 150 also includes a generally annular nozzle ring 170 axially spaced from the nozzle portion 164, and an array of vanes 180 circumferentially spaced about the nozzle ring and rotatably mounted to the nozzle ring such that the vanes are variable in setting angle for regulating exhaust gas flow to the turbine wheel. The nozzle ring 170 is rigidly affixed to the nozzle portion 164, such as by rigid spacers 166 (FIGS. 2 and 3) that extend between these parts and maintain a fixed spacing between them.

The turbine housing 110 includes a generally ring-shaped flange 111 that opposes a flange 144 of the center housing 140. The turbine housing flange 111 and center housing flange 144 have opposing axially facing surfaces that are stepped such that there is a radially outer pair of opposing surfaces and a radially inner pair of opposing surfaces. A radially outer portion of a generally annular retainer ring 190 is disposed and clamped between the inner pair of opposing surfaces. A resilient sealing ring 192 is disposed and axially compressed between the outer pair of opposing surfaces. In the illustrated embodiment, the sealing ring 192 has a generally U-shaped cross-section oriented such that an open side of the U faces radially inwardly. However, other configurations of sealing ring can be used. A radially inner portion of the retainer ring 190 engages an axially downstream-facing surface of the nozzle ring 170 and thereby limits the extent to which the nozzle ring 170 can move axially in the downstream direction (i.e., to the right in FIG. 1).

A spring element 194, which in the illustrated embodiment also comprises a heat shield, is disposed between a radially inner portion of the nozzle ring 170 and a portion of the center housing 140. The heat shield 194 is a sheet metal part constructed of a resilient metal, and the heat shield has a non-flat configuration such that the heat shield acts as a spring element when axially compressed. The heat shield is generally annular and has a radially outer portion engaged against an axially upstream-facing surface of the nozzle ring 170 and a radially inner portion engaged against an axially downstream-facing surface of the center housing 140. The heat shield is axially compressed between these surfaces.

A resilient radially-compressible locator ring 196 is disposed between a radially inward-facing surface of the nozzle ring 170 and a radially outward-facing surface of the center housing 140 and is engaged against the inward- and outward-facing surfaces so as to radially locate the nozzle ring with respect to the center housing. The locator ring comprises a generally annular body having a generally C-shaped cross-section that defines a radially outer leg and a radially inner leg, the radially outer leg engaged against the radially inward-facing surface of the nozzle ring 170 and the radially inner leg engaged against the radially outward-facing surface of the center housing 140.

Figure 2:
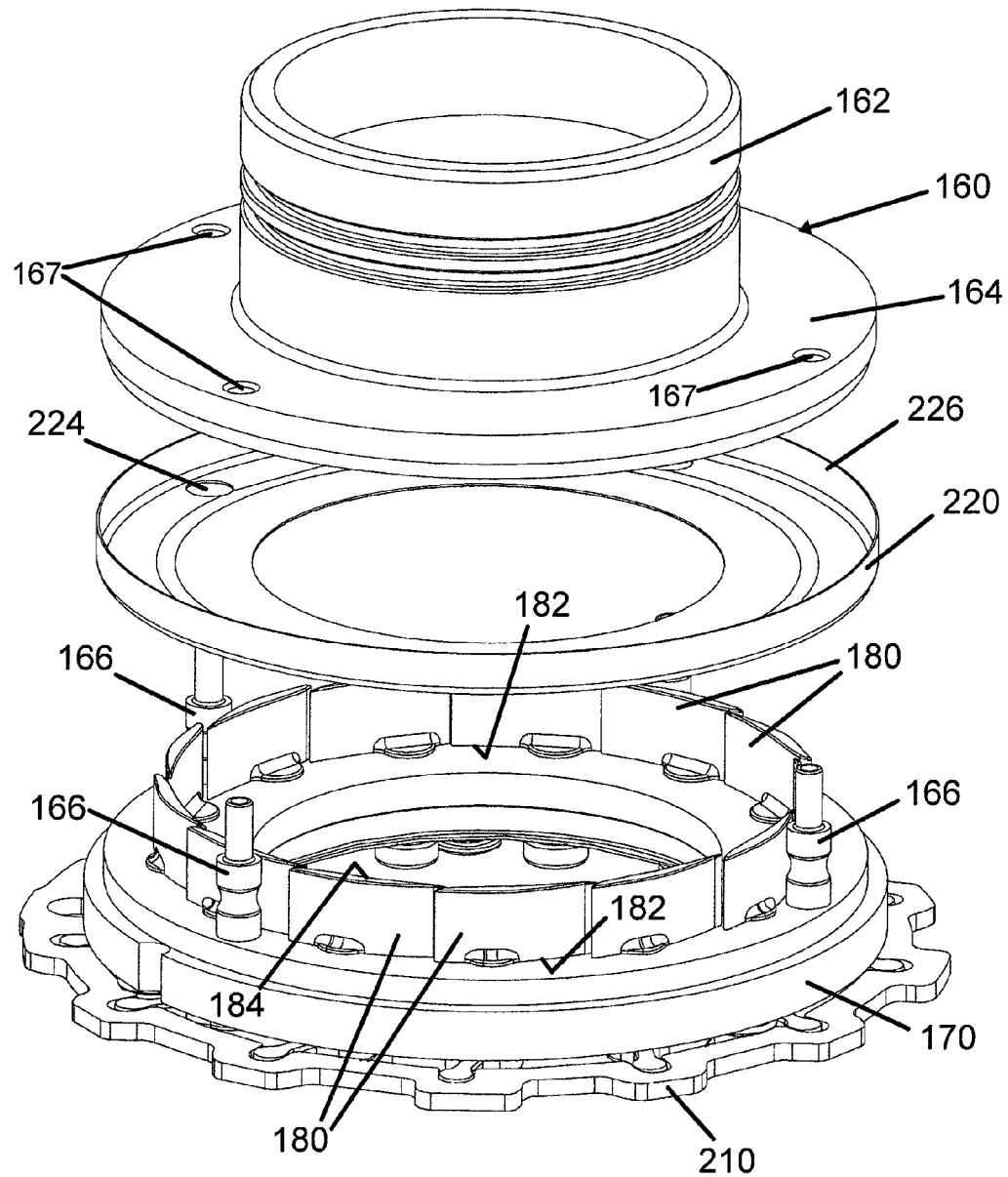
FIG. 2 is an exploded view of a variable-nozzle assembly in accordance with an embodiment of the invention.
Figure 3:
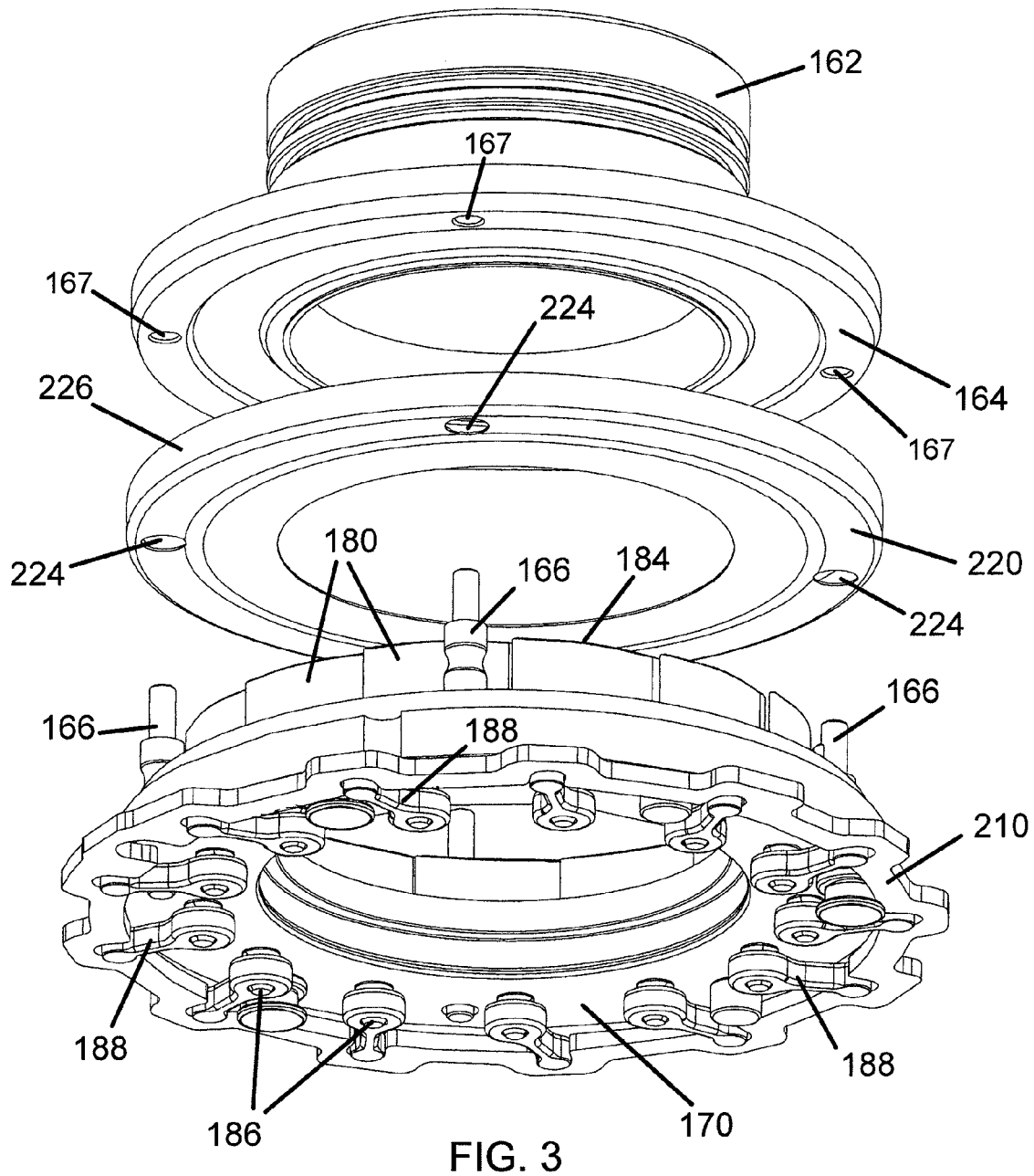
FIG. 3 is another exploded view of the variable-nozzle assembly.
Figure 4:
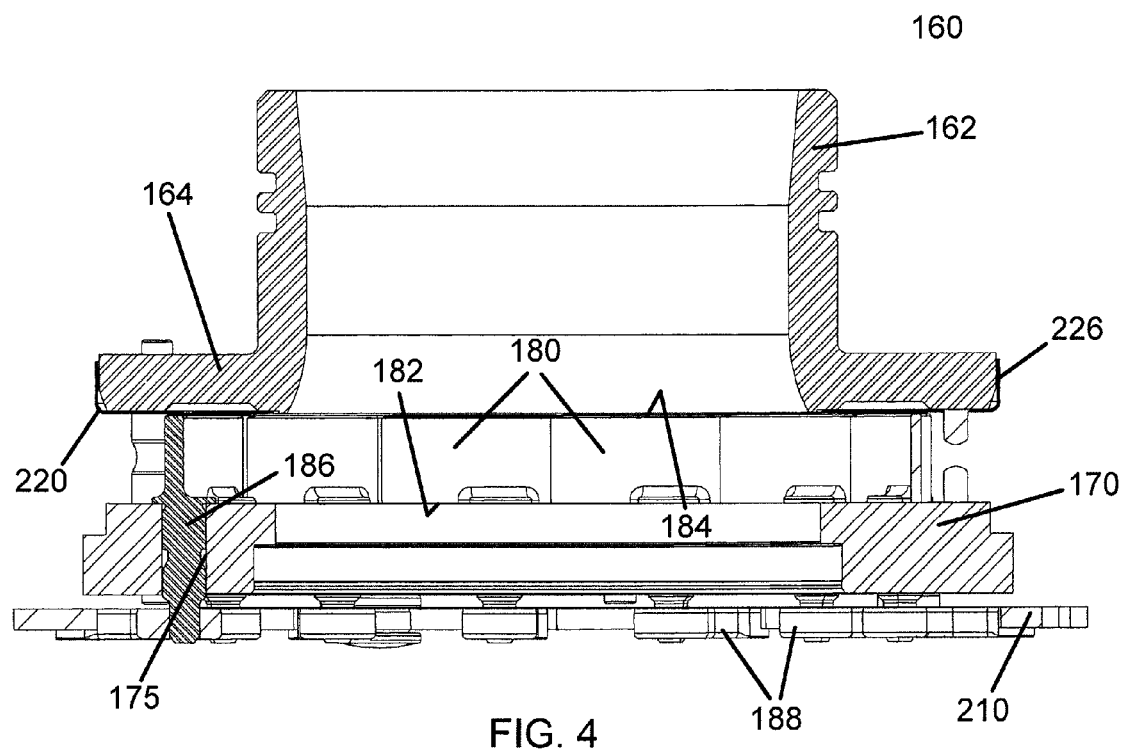
FIG. 4 is a cross-sectional view of the variable-nozzle assembly.

With reference to FIGS. 2 and 3, the vanes 180 have proximal ends 182 and opposite distal ends 184. The proximal ends 182 of the vanes are rigidly affixed to axles 186 (FIG. 4) of generally cylindrical form. The nozzle ring 170 includes bearing apertures 175 (FIG. 4) that extend axially through the nozzle ring 170. The axles 186 of the vanes pass through the bearing apertures 175 with a loose enough fit to allow the axles to rotate about their axes, but the clearance between the axles and the apertures is small enough to substantially fix the axial orientation of the axes of rotation of the axles.

The axles 186 have distal ends that project out from the bearing apertures 175 beyond the first face 172 of the nozzle ring. Vane arms 188 are rigidly joined to the distal ends of the axles 186. The vane arms have opposite free ends that engage a unison ring 210 disposed adjacent the first faced 172 of the nozzle ring. The unison ring 210 is generally coaxial with the nozzle ring and is rotatable about its axis, actuated by a suitable actuator (not shown). Rotation of the unison ring in one direction causes the vane arms 188 to pivot in a direction that pivots the vanes 180 toward their open position; rotation of the unison ring in the other direction pivots the vanes toward their closed position.

Figure 5:
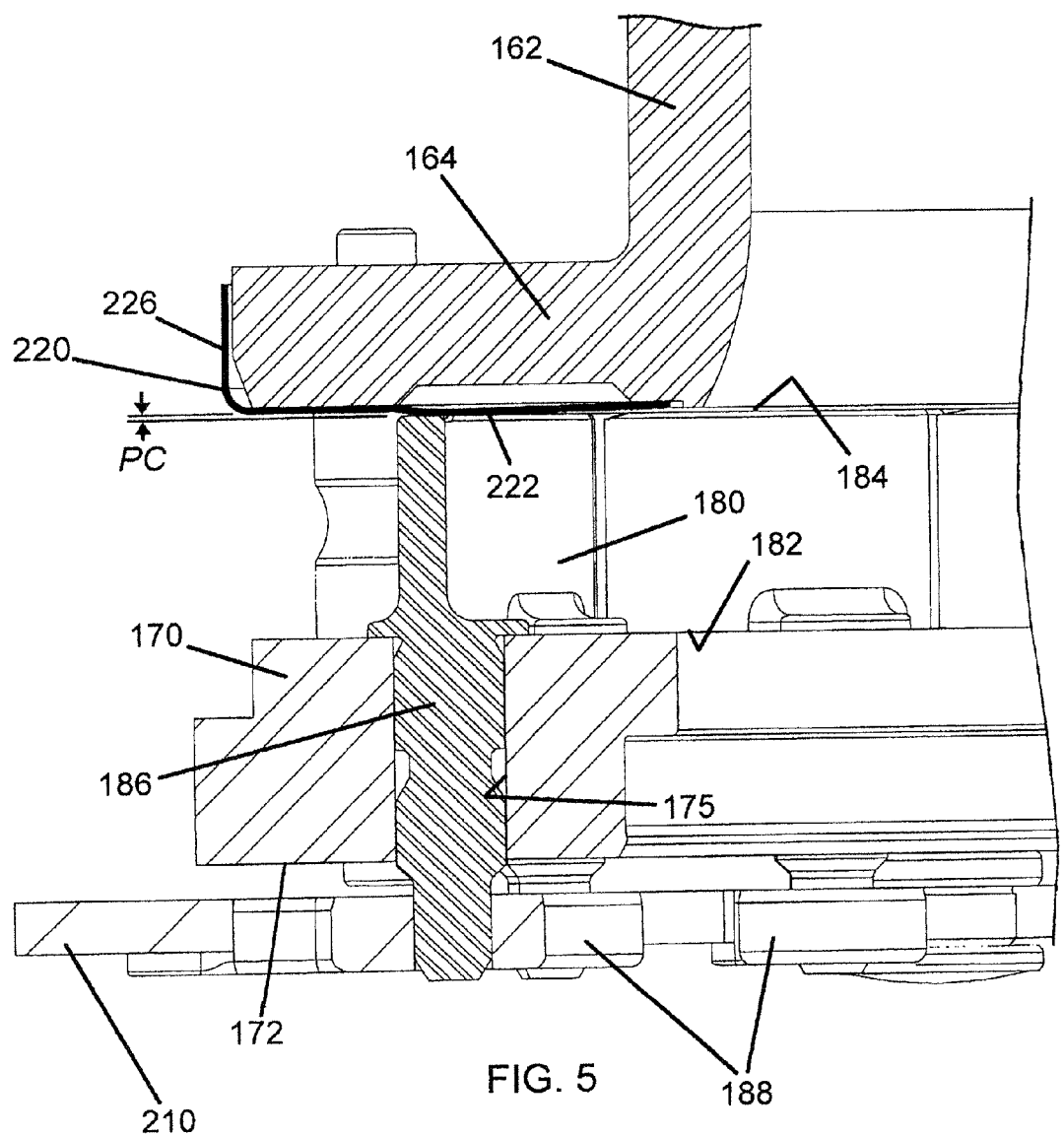
FIG. 5 is greatly magnified portion of FIG. 4.

In accordance with the invention, the variable-nozzle assembly 150 includes a generally annular vane sealing member 220 formed separately from the insert 160 and supported on the nozzle portion 164 of the insert. As best seen in FIG. 5, the vane sealing member 220 has a portion 222 that is disposed between the distal ends 184 of the vanes 180 and the nozzle portion 164 of the insert. The portion 222 of the vane sealing member is configured to be contacted by the distal ends 184 of the vanes when the vanes are in the closed position. A clearance exists, however, between the portion 222 of the vane sealing member and the distal ends 184 of the vanes when the vanes are in the open position.

As noted, the nozzle ring 170 and the nozzle portion 164 of the insert are connected to each other by a plurality of spacers 166. In one embodiment, the vane sealing member 220 includes apertures 224 (FIGS. 2 and 3) through which the spacers 166 pass. Optionally, as illustrated in FIGS. 2 and 3, the spacers 166 can include smaller-diameter portions that pass through the apertures 224 and extend into openings 167 in the nozzle portion 164 where they are rigidly affixed, and larger-diameter portions or shoulders that contact the vane sealing member 220 and maintain it in contact with the nozzle portion 164. The spacers thereby provide an anti-rotation feature for the vane sealing member 220 and maintain the spacing between the nozzle ring 170 and nozzle portion 164.

In one embodiment, the vane sealing member 220 includes a flange 226 that extends generally axially from a radially outer edge of the vane sealing member. The flange 226 engages a radially outer surface of the nozzle portion 164 of the insert.

Optionally, the vane sealing member 220 can include a lip (not shown) that extends generally axially from a radially inner edge of the vane sealing member, and the insert 160 can include a groove (not shown) in which the lip is engaged so as to locate the vane sealing member with respect to the insert.

The vane sealing member 220 can be a compliant (i.e., elastically and resiliently deformable) thin sheet metal part that can provide a light spring load on the distal ends 184 of the vanes. Contact between the vanes and the vane sealing member is designed to provide a positive (non-zero) clearance PC (FIG. 5) at the vane leading and trailing edges when the vanes are in the open position (which is when the leading and trailing edges are farthest in the radial direction from the vane axles 186). Closer to the vane axles 186 in the radial direction the clearance is zero, and therefore when the vanes are closed (where the leading and trailing edges are closest in the radial direction to the vane axles) the clearance is zero at the leading and trailing edges.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger having a variable-nozzle assembly, comprising:
a compressor housing and a compressor wheel mounted in the compressor housing and connected to a rotatable shaft, and a turbine housing and a turbine wheel mounted in the turbine housing and connected to the rotatable shaft, the turbine housing defining a chamber surrounding the turbine wheel for receiving exhaust gas from an engine and for supplying the exhaust gas through a nozzle leading from the chamber generally radially inwardly to the turbine wheel, the turbine housing further defining an axial bore;
an insert formed separately from the turbine housing, the insert having a tubular portion received into the axial bore of the turbine housing and an annular nozzle portion joined to one end of the tubular portion and extending radially outward therefrom;
a nozzle ring having opposite first and second faces, the nozzle being defined between the second face and the nozzle portion of the insert, the nozzle ring having a plurality of circumferentially spaced-apart bearing apertures each extending axially from the first face to the second face;
a plurality of vanes disposed in the nozzle and each having a proximal end and a distal end, axles being joined to the proximal ends and being received into the bearing apertures of the nozzle ring and being rotatable in the bearing apertures, the distal ends of the vanes being proximate the nozzle portion of the insert, the vanes being rotatable between a closed position and an open position; and
a generally annular vane sealing member formed separately from the insert and supported on the nozzle portion of the insert, the vane sealing member having a portion that is disposed between the distal ends of the vanes and the nozzle portion of the insert;
wherein said portion of the vane sealing member is configured to contact leading and trailing edge portions of the distal ends of the vanes and to exert an axial load on the vanes tending to urge the vanes toward the nozzle ring when the vanes are in the closed position, while a clearance exists between said portion of the vane sealing member and said leading and trailing edge portions of the distal ends of the vanes when the vanes are in the open position.

2. The turbocharger of claim 1, wherein the nozzle ring and the nozzle portion of the insert are connected to each other by a plurality of spacers, and the vane sealing member includes apertures through which the spacers pass.

3. The turbocharger of claim 1, wherein the vane sealing member includes a flange that extends generally axially from a radially outer edge of the vane sealing member, the flange engaging a radially outer surface of the nozzle portion of the insert.

4. The turbocharger of claim 3, wherein the nozzle ring and the nozzle portion of the insert are connected to each other by a plurality of spacers, and the vane sealing member includes apertures through which the spacers pass.

5. The turbocharger of claim 1, wherein the vane sealing member includes a lip that extends generally axially from a radially inner edge of the vane sealing member, and the insert includes a groove in which the lip is engaged so as to locate the vane sealing member with respect to the insert.

6. The turbocharger of claim 1, wherein the vane sealing member comprises a compliant thin sheet metal part.

7. A variable-nozzle assembly for a turbocharger, the turbocharger including a turbine housing that defines a chamber and a nozzle leading from the chamber radially inwardly into an axial bore in the turbine housing, the variable-nozzle assembly comprising:

an insert having a tubular portion adapted to be received into the axial bore of the turbine housing and an annular nozzle portion joined to one end of the tubular portion and extending radially outward therefrom;

a nozzle ring having opposite first and second faces, a nozzle passage being defined between the second face and the nozzle portion of the insert, the nozzle ring having a plurality of circumferentially spaced-apart bearing apertures each extending axially from the first face to the second face;

a plurality of vanes disposed in the nozzle passage and each having a proximal end and a distal end, axles being joined to the proximal ends and being received into the bearing apertures of the nozzle ring and being rotatable in the bearing apertures, the distal ends of the vanes being proximate the nozzle portion of the insert, the vanes being rotatable between a closed position and an open position; and a generally annular vane sealing member formed separately from the insert and supported on the nozzle portion of the insert, the vane sealing member having a portion that is disposed between the distal ends of the vanes and the nozzle portion of the insert;

wherein said portion of the vane sealing member is configured to be contacted by the distal ends of the vanes when the vanes are in the closed position, while a clearance exists between said portion of the vane sealing member and the distal ends of the vanes when the vanes are in the open position.

8. The variable-nozzle assembly of claim 7, wherein the nozzle ring and the nozzle portion of the insert are connected to each other by a plurality of spacers, and the vane sealing member includes apertures through which the spacers pass.

9. The variable-nozzle assembly of claim 7, wherein the vane sealing member includes a flange that extends generally axially from a radially outer edge of the vane sealing member, the flange engaging a radially outer surface of the nozzle portion of the insert.

* * * * *